United States Patent Office 2,980,586

Patented Apr. 18, 1961

1

2,980,586

METHOD OF PRODUCING SWINE ERYSIPELAS VACCINE

Carl J. Norden, Jr., Lincoln, Nebr., and Clinton W. Gray, Bogota, Colombia, assignors, by mesne assignments, to Norden Laboratories, Inc., Lincoln, Nebr., a corporation of Delaware No Drawing. Filed June 9, 1958, Ser. No. 740,581

17 Claims. (Cl. 167—78)

This invention relates to a vaccine for the prevention of swine erysipelas and to a method of preparing the same, the present application being a continuation-in-part of our copending application for patent on "Swine Erysipelas Vaccine and Method of Producing Same," filed in the United States Patent Office November 12, 1954, Serial No. 468,544, now abandoned.

Swine erysipelas is an acute, sub-acute or chronic infectious disease of swine characterized by gastro-enteritis, swelling of the spleen, and degeneration of the liver and heart muscles. Swine erysipelas is widespread on the continent of Europe and in the United States. Its occurrence varies from enzootic to an epidemic in various regions, and is of varying intensity. Its chief occurrence is in swine, but man, lambs, pigeons, turkeys, rabbits, and mice are susceptible. Swine erysipelas constitutes from 10 to 15 percent of the infectious diseases in swine in the midwestern portion of the United States, and has, therefore, become of utmost importance throughout the swine raising areas due to losses encountered through death of infected animals and stunted growth and unthriftiness of those animals having the sub-acute or chronic form of the disease.

The organism causing the disease was discovered by Pasteur in 1882 and its first isolation in this country was accomplished in 1920. The organism is known as the bacillus *Erysipelothrix rhusiopathiae*.

Where there have been serious outbreaks of swine erysipelas, infection tends to occur in succeeding crops of pigs, either through contact with chronically infected animals that appear to be healthy, or through exposure to contaminated houses, lots and pastures. In the period from 1931 to 1937 it was determined that prevention of swine erysipelas was of utmost importance throughout the swine raising areas, and various types of immunizing agents were studied.

The first anti-swine erysipelas serum was produced in 1893 and injected into animals exposed to the danger of infection or in the incubation stages of the disease. The serum produces immediately immunity, but the immunity is of short duration, lasting approximately two or three weeks, and treatment must be repeated at the end of that time if additional protection is required.

In 1896 a more active immunization was created by the simultaneous injection of anti-swine erysipelas serum and a culture of living virulent erysipelas organisms. This procedure results in a satisfactory active immunity in the animals vaccinated and has been employed by veterinarians up to the present time. However, the anti-swine erysipelas serum must be used simultaneously with the virulent erysipelas culture to prevent the danger of erysipelas infection. Also, if the culture is not handled properly, the virulent erysipelas organisms are apt to spread the disease in swine, and being pathogenic for the human, they expose the veterinarian, swine producer and meat packer to the danger of infection. Other disadvantages are that the vaccination must be performed each year in order to prevent recurrence of infection in the swine by other swine brought into the herd. Also, all susceptible swine on the premises must be immunized, due to the possibility of the spread of the disease from immunized animals to those which may be susceptible to the disease; and the cost is relatively high due to the necessity of using anti-swine erysipelas serum with the vaccine.

Prior to 1927 it had been proposed to produce a modified strain of erysipelas organisms by artificial means or by passing virulent erysipelas organisms through suitable animals to attenuate or reduce the virulence thereof, but such methods were unsuccessful because such vaccines could not be depended upon and they contained infectious matter that caused complications. In 1927, it was proposed that the infectious matter, the morbific agents or their products that caused the complications, could be treated with solutions of aniline dyes for the purification and preservation of vaccines, but the process results in attenuated or dead erysipelas organisms. Attenuated (enfeebled) or dead organisms cannot be depended upon to provide the required immunization or to produce a vaccine that gives safe and solid immunization of swine or satisfactory duration of immunity.

Therefore, the principal objects of the present invention are to provide an immunizing agent against swine erysipelas which contains a vigorous avirulent strain of *Erysipelothrix rhusiopathiae* for producing an active, solid, and durable immunity, and to provide an immunizing agent that is safely produced and administered, because it constitutes an effective living avirulent strain of erysipelas organisms.

Another object of the invention is to provide a relatively inexpensive and novel method of producing a vigorous and avirulent strain of erysipelas organisms.

A further object of the invention is to provide for production of a vaccine containing a vigorous and avirulent strain of living erysipelas organisms and which is free of the chemical that established the strain, so that no adverse reaction is possible either in the vaccine or the animal to be immunized.

In accomplishing these and other objects of the present invention, we have provided a method of creating a vigorous avirulent strain of living *Erysipelothrix rhusiopathiae* in a stock culture media, and which avirulent strain is multiplied and grown in accordance with the present invention, to provide the vaccine without change in avirulency of the living organisms.

It is to be understood that in describing the present invention, "virulent" is used to designate *Erysipelothrix rhusiopathiae* organisms that are markedly pathogenic and are fully capable of producing the disease of erysipelas, whereas "avirulent" is used to designate vigorously alive erysipelas organisms that are incapable of producing the disease of erysipelas. It is to be further understood that "attenuated" refers to enfeebled or weakened virulent erysipelas organisms, which, when removed from the influence that enfeebles them, may revert to their original highly virulent form and are fully capable of producing the disease known as swine erysipelas. In a vaccine containing attenuated organisms, there is enough "virulence" to cause at least a mild form of disease, which in turn, stimulates antibody formation. "Avirulent," on the other hand, means complete lack of virulence, and a vaccine containing living avirulent erysipelas organisms does not produce even a mold form of the disease, but does exhibit suitable antigenicity.

The stock culture media employed to develop the avirulent strain of *Erysipelothrix rhusiopathiae* is one that provides the best nutrition of the erysipelas bacteria, and consists of beef or horse meat, preferably beef heart, deionized water, peptone, sodium chloride, sodium ammonium phosphate, and agar. The following formula is an example:

| | | |
|---|---|---|
| Beef heart | grams | 500 |
| Deionized water | cc | 1,000 |
| Peptone | percent | 1 |
| Sodium chloride | do | 0.5 |
| Sodium ammonium phosphate | do | 0.1 |
| Agar | do | 2 |

The ingredients are mixed together and brought to a boil for a period of 45 minutes and until the ingredients have dissolved. The mixture is then alkalinized with sodium hydroxide to a pH value of 8.0. The mixture is then sterilized to 110 degrees centigrade for 30 minutes, after which the pH value is adjusted to approximately 7.5. The mixture is filtered, while hot, and again sterilized at a temperature of 110 degrees centigrade for 30 minutes.

We have discovered that virulent *Erysipelothrix rhusiopathiae* organisms thrive in the stock media in the presence of an extremely small quantity of trypaflavine, and that the virulent organisms will be converted to a strain of avirulent *Erysipelothrix rhusiopathiae* organisms that can be grown and multiplied in like kind in a culture media without the trypaflavine and that the strain of living organisms will retain their avirulency.

We are aware that dye solutions, such as brilliant green, fuchsin, and trypaflavine, are well known killers or growth inhibitors of disease organisms, similar to the use of formaldehyde or phenol in the production of bacteria where the chemicals are added to organisms in the production bacteria. But to our knowledge, no one, prior to the present invention, has discovered that the addition of a minute portion of trypaflavine to a culture in which virulent erysipelas organisms are grown will cause the virulent organisms to change to a strain of avirulent organisms having the same vigorous growth characteristics. The trypaflavine may be added to the culture medium in solution.

We have discovered that for good results a satisfactory proportion of trypaflavine to be added is approximately 10 cc. of 0.1 percent solution of trypaflavine in distilled water to approximately 1,000 cc. of culture media. We have also determined that the minimum and maximum concentration of trypaflavine in the culture media to produce and maintain an avirulent culture of *Erysipelothrix rhusiopathiae* which has high antigenic activity is from 0.0001 percent as the minimum to 0.01 percent as the maximum. Below this range, the development of avirulency is too slow and the level of antigenic activity is low. Above this range, the morphology of the organism is changed, a low level of antigenicity becomes apparent, and/or the growth of the organisms is inhibited.

We also know that with brilliant green and fuchsin in the concentrations which might develop an avirulent strain, the organisms are killed or the morphology and growth characteristics of the organisms are modified and low level antigenicity is developed.

One method of carrying out the process is as follows:

Virulent *Erysipelothrix rhusiopathiae* organisms are inoculated into the usual standard culture media and permitted to grow actively for 48 hours.

A stock culture media prepared as above described and containing 0.001 percent trypaflavine is sterilized for approximately 45 minutes in flowing steam.

Upon completion of the stock culture media containing the trypaflavine, it is inoculated with virulent *Erysipelothrix rhusiopathiae* organisms taken from the standard culture media. The erysipelas organisms are allowed to grow in the stock culture media containing the 0.001 percent trypaflavine for 24 hours, after which the organisms are trasferred to fresh culture media prepared as above described and also containing the trypaflavine and incubated for 48 to 72 hours at a temperature of 37 degrees centigrade. The organisms are again transferred two or more additional times, and each time incubated for 24 hours at 37 degrees centigrade.

After conversion has been completed, the avirulent strain of erysipelas organisms are used to inoculate a production culture media composed of beef or horse meat, but preferably beef heart, deionized water, peptone, sodium chloride, sodium ammonium phosphate, and agar, but without the trypaflavine. The avirulent strain of erysipelas organisms multiply in this culture to produce the vaccine product.

The production culture media formula is substantially as follows:

| | | |
|---|---|---|
| Beef heart | grams | 500 |
| Deionized water | cc | 1,000 |
| Peptone | percent | 1 |
| Sodium chloride | do | 0.5 |
| Sodium ammonium phosphate | do | 0.1 |
| Agar | do | 2 |

The ingredients are mixed together and brought to a boil for a period of 45 minutes and until the ingredients have dissolved. The mixture is then alkalinized with sodium hydroxide to a pH value of 8.0. The mixture is then sterilized at 110 degrees centigrade for 30 minutes, after which the pH value is adjusted to 7.5. The mixture is filtered while hot, and sterilized at a temperature of 110 degrees centigrade for 30 minutes.

On completion of the production media, it is inoculated with living avirulent organisms which have been removed from the stock culture, and which have first been shown to be non-pathogenic to susceptible laboratory animals such as pigeons, mice and susceptible swine.

The inoculated production media is then incubated at 37.5 degrees centigrade for a period of about 48 hours, during which time the avirulent strain of organisms multiply in a vigorous growth of avirulent erysipelas organisms having highly satisfactory antigenicity. The vaccine is then harvested from the culture in the customary manner and filled into final containers. The vaccine may also be desiccated. We have called the product produced as described "Erysipelas Vaccine-Live Culture-Avirulent."

Numerous laboratory tests were conducted to demonstrate the avirulence of the vaccine and its ability to stimulate the development of a solid and durable active immunity in swine.

*Experiment 1*

The susceptibility of pigeons to swine erysipelas has long been established, and for many years they have been used in laboratory testing. Subcutaneous administration of 0.5 cc. of an 18- to 20-hour culture of virulent *Erysipelothrix rhusiopathiae* consistently causes death in 72 to 96 hours. Erysipelas Vaccine-Live Culture-Avirulent, in quantities up to 4.0 cc., was injected into pigeons with no evidence of illness or death. Fourteen to 21 days later, these birds, together with suitable controls, were challenged by the subcutaneous administration of 0.5 cc. of virulent erysipelas culture, and, while all controls died within 72 to 96 hours, none of the pigeons vaccinated with Erysipelas Vaccine-Live Culture-Avirulent sickened and died.

*Experiment 2*

White Swiss mice weighing 15 to 18 gm. were injected subcutaneously with varying amounts of the Erysipelas Vaccine-Live Culture-Avirulent, ranging from 0.05 to 0.5 cc., and all mice survived, remaining well and healthy. At intervals ranging from 14 to 30 days following the injection of Erysipelas Vaccine-Live Culture-Avirulent, all injected mice, together with suitable controls, were challenged by the subcutaneous administration of 0.1 cc. of virulent erysipelas culture capable of killing susceptible mice in 72 to 96 hours. All vaccinated mice survived this challenge, and all susceptible controls died in 48 to 72 hours.

*Experiment 3*

Controlled experiments were conducted on swine, the susceptibility of which was determined by the scarification method. Following demonstration of susceptibility, 20 swine weighing 60 to 70 lb. were vaccinated using 2.0 cc. of Erysipelas Vaccine-Live Culture-Avirulent, and, ten to 14 days later, scarification challenge was conducted. Vaccinated pigs showed no temperature rise and no development of skin lesions, while 5 unvaccinated, susceptible control pigs from the same drove, exposed at the same time and using the same challenge culture, each showed a marked temperature rise, persisting for seven to ten days, as well as a severe hyperemia and edema, frequently generalizing with rhomboidal lesions on areas of the body separated from the scarification sites.

The favorable results in these experiments, both in laboratory animals and swine, demonstrated the feasibility of field trial testing of the product.

*Exeperiment 4*

The field trial testing followed the same general procedure used in our laboratory tests, susceptibility of the drove being determined by prevaccination scarification challenge. At the time of vaccination with Erysipelas Vaccine-Live Culture-Avirulent, susceptible animals were left in the drove to demonstrate the absence of premise exposure to the virulent erysipelas organism. At varying intervals following vaccination, vaccinated and control animals were selected from these droves and challenged by means of scarification to demonstrate the potency and duration of immunity engendered by the use of the product.

The Erysipelas Vaccine-Live Culture-Avirulent as above prepared is administered subcutaneously in dosage of two to five cc., depending on the size of the pig.

The product produced as described has the following advantages: an avirulent culture is assured for the vaccination procedure and it will not cause erysipelas in the injected animal; simultaneous injection of anti-swine erysipelas serum is not necessary; anti-swine erysipelas serum may be used in conjunction with the culture for the immunization of swine if the veterinarian feels that there may have been exposure to swine erysipelas prior to vaccination or there is a possibility that the disease is in the incubation period; it is also possible to immunize a portion of a drove of swine with no danger of spreading the infection from the vaccinated animals to the susceptible animals with which they are in contact; a single injection stimulates the production of a solid and durable active immunity; and the danger of human infection due to an accident or contact with the vaccine or vaccinated animals is eliminated.

It is also stressed that the use of trypaflavine is an active part of the cultural process, but it is no part of the finished vaccine product.

What we claim and desire to secure by Letters Patent is:

1. The method of producing an avirulent strain of *Erysipelothrix rhusiopathiae* organisms including growing *Erysipelothrix rhusiopathiae* organisms in culture media containing trypaflavine.

2. The method of producing an avirulent strain of *Erysipelothrix rhusiopathiae* organisms, including growing *Erysipelothrix rhusiopathiae* organisms in culture media containing trypaflavine in approximately the proportion of 10 cc. of 1 percent solution of trypaflavine in distilled water to 1,000 cc. of the culture media.

3. The method of producing an avirulent strain of *Erysipelothrix rhusiopathiae* organisms including growing *Erysipelothrix rhusiopathiae* organisms in culture media having a pH of approximately 7.5 and containing trypaflavine for developing living avirulent *Erysipelothrix rhusiopathiae* organisms.

4. The method of producing an avirulent strain of *Erysipelothrix rhusiopathiae* organisms, including growing *Erysipelothrix rhusiopathiae* organisms in cuulture media having a pH of approximately 7.5 and containing trypaflavine in approximately the proportion of 10 cc. of 1 percent solution of trypaflavine in distilled water to 1,000 cc. of said culture media for developing living avirulent *Erysipelothrix rhusiopathiae* organisms.

5. The method of producing swine erysipelas vaccine including providing a stock culture of *Erysipelothrix rhusiopathiae* organisms containing trypaflavine to produce an avirulent strain of said organisms, providing a production culture media, removing avirulent organisms from the stock culture, inoculating the production culture media with avirulent organisms which have been removed from the stock culture, incubating the inoculated media, and harvesting living avirulent organisms from the stock culture to provide the vaccine.

6. The method of producing swine erysipelas vaccine including providing a stock culture of *Erysipelothrix rhusiopathiae* organisms containing trypaflavine to produce an avirulent strain of said organisms, removing avirulent organisms from the stock culture, providing a production culture media, inoculating the production culture media with avirulent organisms which have been removed from the stock culture, incubating the inoculated media at a temperature of 37.5 degrees centigrade for a period of approximately 48 hours, and harvesting living avirulent organisms from the stock culture to provide the vaccine.

7. The method of producing swine erysipelas vaccine including providing a stock culture of *Erysipelothrix rhusiopathiae* organisms containing trypaflavine to produce an avirulent strain of said organisms, providing a sterile production culture media having a pH of 7.5, removing avirulent organisms from the stock culture, inoculating the production culture media with avirulent organisms which have been removed from the stock culture, incubating the inoculated media at a temperature of approximately 37.5 degrees centigrade for a period of approximately 48 hours, and harvesting living avirulent organisms from the stock culture to provide the vaccine.

8. The method of producing swine erysipelas vaccine including providing a stock culture of *Erysipelothrix rhusiopathiae* organisms having an approximate pH of 7.5 and containing trypaflavine to produce an avirulent strain of said organisms, providing a sterile production culture media having a pH of approximately 7.5, removing avirulent organisms from the stock culture, inoculating the production culture media with avirulent organisms which have been removed from the stock culture, incubating the inoculated culture media at a temperature of approximately 37.5 degrees centigrade for a period of about 48 hours, and harvesting living avirulent organisms from the stock culture to provide the vaccine.

9. The method of producing an avirulent swine erysipelas vaccine including producing a beef-type stock culture media, inoculating said media with virulent *Erysipelothrix rhusiopathiae* organisms, and adding trypaflavine to the said stock culture media in the approximate proportion of 10 cc. of 0.1 percent solution of trypaflavine in distilled water to 1,000 cc. of the said stock culture media for rendering said organisms into a living strain of avirulent organisms to provide said swine erysipelas vaccine.

10. The method of producing an avirulent swine erysipelas vaccine including producing a beef-type stock culture media, inoculating said media with virulent *Erysipelothrix rhusiopathiae* organisms, adding trypaflavine to the said stock culture media in the approximate proportion of 10 cc. of 0.1 percent solution of trypaflavine in distilled water to 1,000 cc. of the said stock culture media for rendering said organisms avirulent, providing a beef-type production culture media, removing living avirulent organisms from said stock culture media, adding the living avirulent organisms to the production culture media, incubating the production culture media to effect multiplication of said living avirulent organisms, and harvesting the living avirulent organisms from the production culture media.

11. The method of producing an avirulent swine erysipelas vaccine, including preparation of a beef-type stock culture media, adding from 0.0001% to 0.01% trypaflavine to said stock culture media, inoculating the stock culture media thus prepared with virulent *Erysipelothrix rhusiopathiae* organisms for conversion of the virulent *Erysipelothrix rhusiopathiae* organisms to avirulent erysipelas organisms as determined by inoculation of laboratory animals susceptible to erysipelas, preparing a production culture media similar to the stock culture media except for omission of the trypaflavine, removing living avirulent organisms from the stock culture, inoculating the production culture media with the living avirulent erysipelas organisms when the tests show said organisms to be non-pathogenic to such laboratory animals, incubating the production media to multiply the avirulent strain of erysipelas organisms, and harvesting the living avirulent erysipelas organisms from the production culture media to provide said swine erysipelas vaccine.

12. The method of producing an avirulent swine erysipelas vaccine, including preparation of a sterile stock culture media consisting of

| | |
|---|---|
| Beef heart ---grams-- | 500 |
| Deionized water ---cc-- | 1,000 |
| Peptone ---percent-- | 1 |
| Sodium chloride ---do---- | 0.5 |
| Sodium ammonium phosphate ---do---- | 0.1 |
| Agar ---do---- | 2 |

adding from 0.0001% to 0.01% trypaflavine to said stock culture media, inoculating stock culture media thus prepared with virulent *Erysipelothrix rhusiopathiae* organisms for conversion of the virulent *Erysipelothrix rhusiopathiae* organisms to avirulent living erysipelas organisms, as determined by inoculation of laboratory animals susceptible to erysipelas, preparing a production culture media similar to the stock culture media except for omission of the trypaflavine, removing living avirulent organisms from the stock culture, inoculating the production culture media with the living avirulent erysipelas organisms removed from the stock culture media when the tests show said organisms to be non-pathogenic to such laboratory animals, incubating the production media to multiply the living avirulent strain of erysipelas organisms, and harvesting the living avirulent erysipelas organisms from the production media to provide the swine erysipelas vaccine.

13. The method of producing an avirulent swine erysipelas vaccine, including preparation of a sterile stock culture media consisting of

| | |
|---|---|
| Beef heart ---grams-- | 500 |
| Deionized water ---cc-- | 1,000 |
| Peptone ---percent-- | 1 |
| Sodium chloride ---do---- | 0.5 |
| Sodium ammonium phosphate ---do---- | 0.1 |
| Agar ---do---- | 2 |

adding trypaflavine in approximately 10 cc. of 0.1 percent solution of trypaflavine to approximately 1,000 cc. of the said stock culture media, inoculating stock culture media thus prepared with virulent *Erysipelothrix rhusiopathiae* organisms for conversion of the virulent *Erysipelothrix rhusiopathiae* organisms to living avirulent strain of erysipelas organisms as determined by inoculation of laboratory animals susceptible to erysipelas, preparing a sterile production culture media similar to the stock culture media except for omission of the trypaflavine, removing living avirulent erysipelas orgaisms from the stock culture media, inoculating the production culture media with the living avirulent erysipelas organisms which have been removed from the stock culture media, when the tests show said organisms to be non-pathogenic to such laboratory animals, incubating the production media to multiply the living avirulent strain of erysipelas organisms, and harvesting the living avirulent erysipelas organisms to provide said swine erysipelas vaccine.

14. The method of producing an avirulent swine erysipelas vaccine, including preparation of a beef culture media, adjusting the pH value of the mixture to 8.0, sterilizing the stock culture media, readjusting the pH value of the stock culture media to approximately 7.5, sterilizing the stock culture media, adding 0.0001% to 0.01% trypaflavine to said stock culture media, inoculating the stock culture media thus prepared with virulent *Erysipelothrix rhusiopathiae* organisms, incubating the said stock culture media for conversion of the virulent *Erysipelothrix rhusiopathiae* organisms to avirulent erysipelas organisms, as determined by inoculation of laboratory animals susceptible to erysipelas, preparing a production culture media similar to the stock culture media except for omission of the trypaflavine, removing living avirulent erysipelas organisms from the stock culture media, inoculating the production culture media with the living avirulent erysipelas organisms when the tests show said organisms to be non-pathogenic to such laboratory animals, incubating the production media at 37.5 degrees centigrade for about 48 hours to multiply the avirulent strain of erysipelas organisms, and harvesting the living avirulent erysipelas organisms from the production culture media to provide said swine erysipelas vaccine.

15. The method of producing an avirulent swine erysipelas vaccine, including preparation of a stock culture media consisting of

| | |
|---|---|
| Beef heart ---grams-- | 500 |
| Deionized water ---cc-- | 1,000 |
| Peptone ---percent-- | 1 |
| Sodium chloride ---do---- | 0.5 |
| Sodium ammonium phosphate ---do---- | 0.1 |
| Agar ---do---- | 2 |

adjusting the pH value of the mixture to 8.0, sterilizing the mixture, readjusting the pH value of the mixture to approximately 7.5, sterilizing the adjusted mixture, adding 0.0001% to 0.01% trypaflavine to the said stock culture media, inoculating stock culture media thus prepared with virulent *Erysipelothrix rhusiopathiae* organisms, incubating the said stock culture media for conversion of the virulent *Erysipelothrix rhusiopathiae* organisms to avirulent erysipelas organisms, as determined by inoculation of laboratory animals susceptible to erysipelas, preparing a production culture media similar to the stock culture media except for omission of the trypaflavine, removing living avirulent erysipelas organisms from the stock culture media, inoculating the production culture media with the avirulent erysipelas organisms which have been removed from the stock culture media when the tests show said organisms to be non-pathogenic to such laboratory animals, incubating the production media at 37.5 degrees centigrade for about 48 hours to multiply the avirulent strain of erysipelas organisms, and harvesting the living avirulent erysipelas organisms to provide said swine erysipelas vaccine.

16. The method of producing an avirulent swine erysipelas vaccine, including preparing a beef-type stock culture media, adding from 0.0001% to 0.01% trypaflavine to said stock culture media, inoculating the stock culture media thus prepared with virulent *Erysipelothrix rhusiopathiae* organisms for conversion of the virulent *Erysipelothrix rhusiopathiae* organisms to avirulent erysipelas organisms as determined by inoculation of laboratory animals susceptible to erysipelas, preparing a production culture media similar to the stock culture media except for omission of the trypaflavine, removing living avirulent erysipelas organisms from the stock culture media, inoculating the production culture media with the living avirulent erysipelas organisms which have been removed from the stock culture media when the tests show said organisms to be non-pathogenic to such laboratory animals, incubating the production media to multiply the living avirulent strain of erysipelas organisms, harvesting living avirulent erysipelas organisms from the production media and desiccating the organisms which have been harvested from the production media to provide the vaccine.

17. The method of producing an avirulent swine erysipelas vaccine, including preparation of a sterile stock culture media consisting of

| | |
|---|---|
| Beef heart ---------------------------grams-- | 500 |
| Deionized water --------------------------cc-- | 1,000 |
| Peptone -------------------------percent-- | 1 |
| Sodium chloride -----------------------do---- | 0.5 |
| Sodium ammonium phosphate ----------do---- | 0.1 |
| Agar --------------------------------do---- | 2 |

adding from 0.0001% to 0.01% trypaflavine to said stock culture media, inoculating stock culture media thus prepared with virulent *Erysipelothrix rhusiopathiae* organisms for conversion of the virulent *Erysipelothrix rhusiopathiae* organisms to avirulent erysipelas organisms as determined by inoculation of laboratory animals susceptible to erysipelas, preparing a production culture media similar to the stock culture media except for omission of the trypaflavine, removing living avirulent organisms from the stock culture media, inoculating the production culture media with the living avirulent erysipelas organisms which have been removed from the stock culture media when the tests show said organisms to be non-pathogenic to such laboratory animals, incubating the production media to multiply the living avirulent strain of erysipelas organisms, harvesting the living avirulent erysipelas organisms, and desiccating the living avirulent erysipelas organisms to provide said swine erysipelas vaccine.

References Cited in the file of this patent

UNITED STATES PATENTS

| | | |
|---|---|---|
| 1,476,233 | Zell ------------------- | Dec. 4, 1923 |
| 1,924,968 | Weichlein ------------- | Aug. 29, 1933 |

FOREIGN PATENTS

| | | |
|---|---|---|
| 91,246 | Switzerland ------------ | Oct. 17, 1921 |
| 282,780 | Great Britain ---------- | Mar. 25, 1929 |

OTHER REFERENCES

Difco Manual, Difco Lab., Detroit, Mich., 9th ed., 1955, pp. 77–80.

Fanner: Bacteriology, John Wiley & Sons, N.Y., 3rd ed., 1938, pp. 435, 440.